United States Patent
Ho et al.

(10) Patent No.: US 10,909,332 B2
(45) Date of Patent: Feb. 2, 2021

(54) SIGNAL PROCESSING TERMINAL AND METHOD

(71) Applicant: HTC Corporation, Taoyuan (TW)

(72) Inventors: Chia-Chu Ho, Taoyuan (TW); Chih-Hung Li, Taoyuan (TW); Ching-Hao Lee, Taoyuan (TW); Feng-Jui Kuo, Taoyuan (TW); Hsiu-Po Yang, Taoyuan (TW); Szu-Hua Chiu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 114 days.

(21) Appl. No.: 16/167,514

(22) Filed: Oct. 22, 2018

(65) Prior Publication Data
US 2019/0129949 A1 May 2, 2019

Related U.S. Application Data

(60) Provisional application No. 62/579,904, filed on Nov. 1, 2017.

(51) Int. Cl.
*G06F 40/58* (2020.01)
*H04W 4/80* (2018.01)
(Continued)

(52) U.S. Cl.
CPC .............. *G06F 40/58* (2020.01); *G06F 3/16* (2013.01); *G10L 15/08* (2013.01); *H04B 17/318* (2015.01); *H04M 1/7253* (2013.01); *H04W 4/80* (2018.02); *H04W 76/15* (2018.02); *H04M 2203/2061* (2013.01); *H04M 2242/12* (2013.01); *H04M 2250/02* (2013.01)

(58) Field of Classification Search
CPC .... G06F 40/58; G06F 16/907; G06F 16/9535; G06F 3/16; G06F 17/289; G06F 3/167; G10L 15/005; G10L 15/08; H04L 67/306; H04L 69/22; H04M 1/7253; H04M 2203/2061; H04M 2242/12; H04M 2250/02; H04M 1/6066; H04W 4/80; H04W 76/15; H04B 17/318
See application file for complete search history.

(56) References Cited

U.S. PATENT DOCUMENTS

| | | | | |
|---|---|---|---|---|
| 5,295,068 A | * | 3/1994 | Nishino | G06F 40/55 704/10 |
| 8,032,384 B2 | * | 10/2011 | Rylander | G06F 40/58 704/277 |

(Continued)

*Primary Examiner* — Angela A Armstrong
(74) *Attorney, Agent, or Firm* — CKC & Partners Co., LLC

(57) ABSTRACT

A signal processing terminal is provided that includes a signal transmission circuit and a processor. The signal transmission circuit is configured to receive a first electrical signal and a second electrical signal respectively from a first communication terminal and a second communication terminal, and to attach a first user identification header to the first electrical signal and attach a second user identification header to the second electrical signal. The processor is electrically coupled to the signal transmission circuit, and configured to process the first and second electrical signals according to the first and second user identification headers in sequence within a bus, and to generate and transmit a first and a second processed results back to the signal transmission circuit.

8 Claims, 2 Drawing Sheets

(51) Int. Cl.
  *H04M 1/725*  (2006.01)
  *G10L 15/08*  (2006.01)
  *G06F 3/16*  (2006.01)
  *H04B 17/318*  (2015.01)
  *H04W 76/15*  (2018.01)

(56) References Cited

U.S. PATENT DOCUMENTS

| | | | |
|---|---|---|---|
| 8,275,602 B2* | 9/2012 | Curry | G09B 5/06 |
| | | | 704/246 |
| 2003/0115059 A1* | 6/2003 | Jayaratne | G06F 40/58 |
| | | | 704/235 |
| 2005/0267738 A1* | 12/2005 | Wilkinson | G06Q 10/107 |
| | | | 704/9 |
| 2006/0271370 A1* | 11/2006 | Li | G10L 15/005 |
| | | | 704/277 |
| 2010/0169073 A1* | 7/2010 | Almagro | G06F 40/58 |
| | | | 704/3 |
| 2011/0228921 A1* | 9/2011 | Singh | H04L 12/1831 |
| | | | 379/202.01 |
| 2016/0026729 A1 | 1/2016 | Gil et al. | |
| 2017/0214611 A1* | 7/2017 | Cordell | H04L 65/1006 |
| 2018/0083792 A1* | 3/2018 | Wanderski | H04L 12/1831 |

* cited by examiner

US 10,909,332 B2

SIGNAL PROCESSING TERMINAL AND METHOD

RELATED APPLICATIONS

This application claims priority to U.S. Application Ser. No. 62/579,904, filed Nov. 1, 2017, which is herein incorporated by reference.

BACKGROUND

Field of Invention

The present invention relates to a multi-terminal speech transmission technology. More particularly, the present invention relates to a signal processing terminal and a signal processing method.

Description of Related Art

The international traveler faces the challenge of a language barrier. Not being able to speak or understand the local language makes even the most basic activities, such as ordering food, awkward if not impossible. Technology-based solutions have been on the market for some time. One of the most common tools is an electronic dictionary. The more advanced models receive typed or spoken phrases in the user's language, translate the phrases into a second language, and display the translated phrases onto a screen or play them through an audio speaker. When traveling to multiple countries in one trip, the user needs to change the settings on the dictionary so that it uses the correct target language.

Smartphones can now perform the tasks previously performed by standalone electronic dictionaries. Launching a smartphone app in a timely manner can sometimes be difficult, though. The user needs to pull out the device, set the target language, and execute the app, which is time-consuming.

Accordingly, what is needed is a signal processing terminal and a signal processing method to address the issues mentioned above.

SUMMARY

An aspect of the present invention is to provide a signal processing terminal that includes a signal transmission circuit and a processor. The signal transmission circuit is configured to receive a first electrical signal and a second electrical signal respectively from a first communication terminal and a second communication terminal, and to attach a first user identification header to the first electrical signal and attach a second user identification header to the second electrical signal. The processor is electrically coupled to the signal transmission circuit, and configured to process the first and second electrical signals according to the first and second user identification headers in sequence within a bus, and to generate and transmit a first and a second processed results back to the signal transmission circuit.

Another aspect of the present invention is to provide a signal processing method used in a signal processing terminal that includes the steps outlined below. A first electrical signal and a second electrical signal are received respectively from a first communication terminal and a second communication terminal by a signal transmission circuit. A first user identification header is attached to the first electrical signal and a second user identification header is attached to the second electrical signal by the signal transmission circuit. The first and second electrical signals are processed according to the first and second user identification headers in sequence within a bus by a processor. A first and a second processed results are generated and transmitted back to the signal transmission circuit.

These and other features, aspects, and advantages of the present invention will become better understood with reference to the following description and appended claims.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
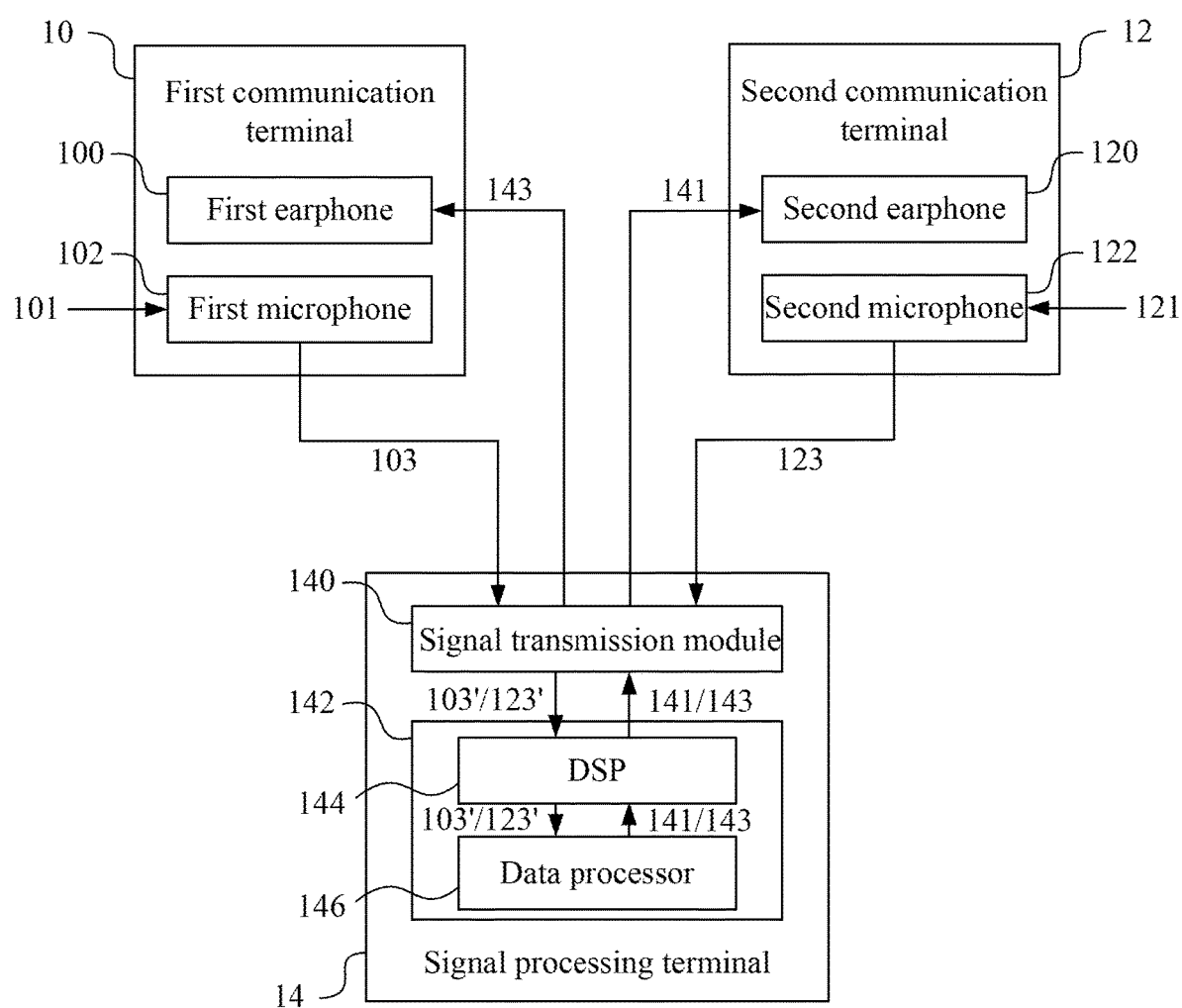
FIG. 1 is a block diagram of a multi-terminal speech transmission apparatus in an embodiment of the present invention.

Reference is now made to FIG. 1. FIG. 1 is a block diagram of a multi-terminal speech transmission apparatus 1 in an embodiment of the present invention. The multi-terminal speech transmission apparatus 1 includes a first communication terminal 10, a second communication terminal 12 and a signal processing terminal 14.

The first communication terminal 10 includes a first earphone 100 and a first microphone 102. The second communication terminal 12 includes a second earphone 120 and a second microphone 122.

In an embodiment, the first earphone 100 and the first microphone 102 are disposed in one package that forms the first communication terminal 10, while the second earphone 120 and the second microphone 122 are disposed in another one package that forms the second communication terminal 12. In a usage scenario, a first user can put the first communication terminal 10 in one of the two ears of the first user and a second user can put the second communication terminal 12 in one of the two ears of the second user.

The first earphone 100 and the second earphone 120 are configured to receive a signal (not illustrated) from the signal processing terminal 14 to reproduce a sound, e.g. a speech sound or a music sound, to the user's ears.

The first microphone 102 and the second microphone 122 are configured to receive a sound, e.g. a speech sound or a music sound from the environment, convert the sound to a signal and transmit the signal to the signal processing terminal 14 such that the signal processing terminal 14 performs processing thereon. More specifically, the first microphone 102 is configured to receive a first sound 101 and converts the first sound 101 to a first electrical signal 103. The second microphone 122 is configured to receive a second sound 121 and converts the second sound 121 to a second electrical signal 123.

The signal processing terminal 14 includes a signal transmission circuit 140 and a processor 142.

In an embodiment, the signal transmission circuit 140 performs transmission in either a wired way or a wireless way. In an embodiment, the signal transmission circuit 140 performs transmission by using the wireless technology such as, but not limited to a Bluetooth technology.

The signal transmission circuit 140 is configured to receive the first electrical signal 101 from the first communication terminal 10. More specifically, in an embodiment, the signal transmission circuit 140 receives the first electrical signal 101 from the first microphone 102. Further, the signal transmission circuit 140 is also configured to receive the second electrical signal 121 from the second communication terminal 12. More specifically, in an embodiment, the signal transmission circuit 140 receives the second electrical signal 121 from the second microphone 122.

Subsequently, the signal transmission circuit 140 is configured to attach a first user identification header to the first electrical signal 103 to generate the first electrical signal 103' with the first user identification header. Further, the signal transmission circuit 140 is configured to attach a second user identification header to the second electrical signal 123 to generate the second electrical signal 123' with the second user identification header.

The processor 142 is electrically coupled to the signal transmission circuit 140 through a bus (not labeled) between the digital signal processor 144 and the signal transmission circuit 140. In an embodiment, the processor 142 is configured to process the first electrical signal 103' and the second electrical signal 123' according to the first and second user identification headers in sequence within the bus.

In an embodiment, the processor 142 includes a digital signal processor (DSP) 144 and a data processor 146. In an embodiment, the digital signal processor 144 is configured to receive the first electrical signal 103' with the first user identification header and the second electrical signal 123' with the second user identification header from the signal transmission circuit 140 to perform digital processing such as, but not limited to digital filtering thereon.

The data processor 146 further perform data processing on the first electrical signal 103' and the second electrical signal 123' to generate a first processed result 141 and a second processed result 143.

In an embodiment, the first sound 101 and the second sound 103 is speech sound, and the data processor 146 is configured to perform a language translation on the first electrical signal 103' and the second electrical signal 123' respectively. The first processed result 141 and the second processed result 143 are a first translation result and a second translation result respectively.

Furthermore, after processing the first processed result 141 and the second processed result 143 by the digital signal processor 144 (e.g. digital processing), the signal processing terminal 14 transmits the first processed result 141 and the second processed result 143 back to the signal transmission circuit 140. Further, the signal transmission circuit 140 transmits the first processed result 141 and the second processed result 143 to the second communication terminal 12 and the first communication terminal 10 respectively.

More specifically, the signal transmission circuit 140 transmits the first processed result 141 to the second earphone 120, and transmits the second processed result 143 to the first earphone 110.

In an embodiment, the signal transmission circuit 140 is able to attach a first delivering header to the first processed result 141 and attach a second delivering header to the second processed result 143 such that the signal transmission circuit 140 transmits the first processed result 141 and the second processed result 143 to the second earphone 120 and the first earphone 110 according to the first delivering header and the second delivering header respectively.

In a usage scenario, a first user puts the first communication terminal 10 in one of the two ears of the first user and a second user puts the second communication terminal 12 in one of the two ears of the second user.

The first user speaks a first language, e.g. English, such that the first earphone 100 receives and converts the speech sound to the first electrical signal 103. The signal transmission circuit 140 attaches the first user identification header to the first electrical signal 103 to generate the first electrical signal 103' with the first user identification header such that the processor 142 performs translation to translate the first language to a second language, e.g. French, to generate and transmit the first processed result 141 to the second earphone 120 through the signal transmission circuit 140. The second user can thus hear the translation result and understand what the first user says.

Likewise, the second user speaks the second language such that the second earphone 120 receives and converts the speech sound to the second electrical signal 123. The signal transmission circuit 140 attaches the second user identification header to the second electrical signal 123 to generate the second electrical signal 123' with the second user identification header such that the processor 142 performs translation to translate the second language to the first language to generate and transmit the second processed result 143 to the first earphone 100 through the signal transmission circuit 140. The first user can thus hear the translation result and understand what the second user says.

In some conditions, the first user and the second user may speak simultaneously such that the processor 142 may not be able to distinguish the sources of the electrical signals if there is no identification mechanism. In the present invention, since the first electrical signal 103' generated from the first sound and the second electrical signal 123' generated from the second sound have different user identification headers, the processor 142 is able to process the electrical signals from different sources in sequence since the processor 142 is able to identify the sources thereof.

The signal processing terminal 14 in the multi-terminal speech transmission apparatus 1 in the present invention is able to perform communication between the first and the second communication terminals 10 and 12 such that the electrical signals from different sources can be processed simultaneously.

It is appreciated that in the above description, two communication terminals are used as an example. In other embodiments, more than two communication terminals can be used such that the electrical signals generated from the sounds received by different communication terminals can be attached with different user identification headers. The simultaneous processing on the electrical signals from more than two communication terminals can thus be realized.

Further, it is appreciated that the language translation is an example of application. In another application, the signal processing terminal 14 can enhance the electrical signals, such as the volume and the quality of the speech, such that the users of the two communication terminals can talk to each other with lower voice and listen to each other clearly in a quiet environment such as a library.

Figure 2:
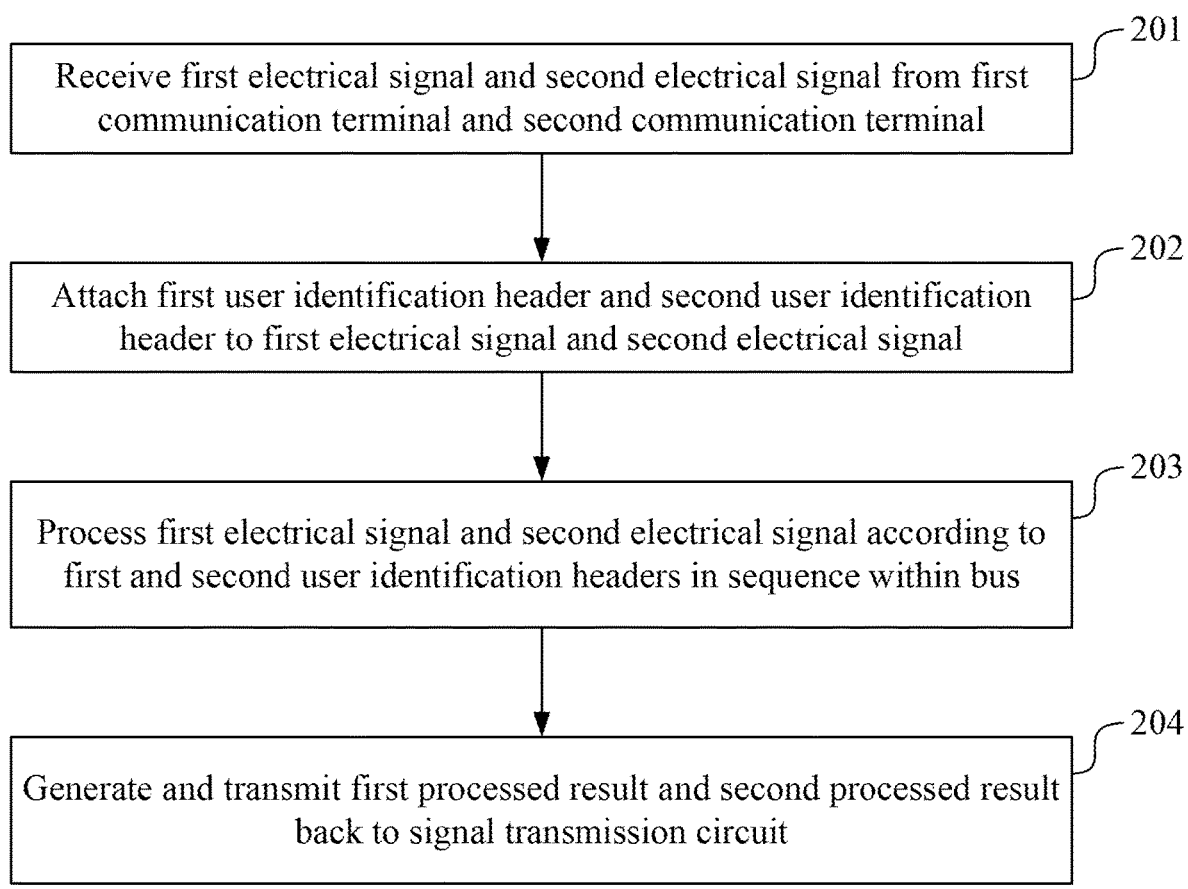
FIG. 2 is a flow chart of a signal processing method in an embodiment of the present invention.

FIG. 2 is a flow chart of a signal processing method 200 in an embodiment of the present invention. The signal processing method 200 can be used in the signal processing terminal 14 illustrated in FIG. 1. The signal processing method 200 includes the steps outlined below (The steps are not recited in the sequence in which the steps are performed. That is, unless the sequence of the steps is expressly indicated, the sequence of the steps is interchangeable, and all or part of the steps may be simultaneously, partially simultaneously, or sequentially performed).

In step 201, the first electrical signal 101 and the second electrical signal 121 are received from the first microphone 102 of the first communication terminal 10 and the second microphone 122 of the second communication terminal 12 by the signal transmission circuit 140.

In step 202, the first user identification header and the second user identification header are attached to the first electrical signal 101 and the second electrical signal 123 by the signal transmission circuit 140.

In step 203, the first electrical signal 101 and the second electrical signal 123 are processed according to the first and second user identification headers in sequence within the bus by the processor 142.

In step 204, the first processed result 141 and the second processed result 143 are generated and transmitted back to the signal transmission circuit 140.

As described above, the processing of the first and the second electrical signal and the generation of the first and the second processed result can be performed simultaneously without being limited by the order of the flow illustrated in FIG. 2.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A signal processing terminal configured for a plurality of terminals to communicate with each other, the signal processing terminal comprising:
    a signal transmission circuit configured to receive a first electrical signal and a second electrical signal respectively from a first communication terminal and a second communication terminal, and to attach a first user identification header to the first electrical signal and attach a second user identification header to the second electrical signal; and
    a processor electrically coupled to the signal transmission circuit, and configured to process the first and second electrical signals according to the first and second user identification headers in sequence within a bus, and to generate and transmit a first and a second processed results back to the signal transmission circuit;
    wherein the signal transmission circuit further attaches a first delivering header to the first processed result and attaches a second delivering header to the second processed result and transmits the first processed result and the second processed result to the second communication terminal and the first communication terminal according to the first delivering header and the second delivering header respectively.

2. The signal processing terminal of claim 1, wherein the processor comprises a digital signal processor and a data processor.

3. The signal processing terminal of claim 1, wherein the processor is configured to perform a language translation on the first electrical signal and the second electrical signal, and the first processed result and the second processed result are a first translation result and a second translation result respectively.

4. The signal processing terminal of claim 1, wherein the signal transmission circuit performs transmission by using a Bluetooth technology.

5. A signal processing method used in a signal processing terminal, wherein the signal processing terminal is configured for a plurality of terminals to communicate with each other, the signal processing method comprising:
    receiving a first electrical signal and a second electrical signal respectively from a first communication terminal and a second communication terminal by a signal transmission circuit;
    attaching a first user identification header to the first electrical signal and attach a second user identification header to the second electrical signal by the signal transmission circuit;
    processing the first and second electrical signals according to the first and second user identification headers in sequence within a bus by a processor; and
    generating and transmitting a first and a second processed results back to the signal transmission circuit;
    wherein generating and transmitting the first and the second processed results back to the signal transmission circuit comprises,
    attaching a first delivering header to the first processed result and attaching a second delivering header to the second processed result by the processor such that the signal transmission circuit transmits the first processed result and the second processed result to the second communication terminal and the first communication terminal according to the first delivering header and the second delivering header respectively.

6. The signal processing method of claim 5, wherein the processor comprises a digital signal processor and a data processor.

7. The signal processing method of claim 5, further comprising:
    performing a language translation on the first electrical signal and the second electrical signal by the processor, and the first processed result and the second processed result are a first translation result and a second translation result respectively.

8. The signal processing method of claim 5, wherein the signal transmission circuit performs transmission by using a Bluetooth technology.

* * * * *